(12) United States Patent
Kim

(10) Patent No.: US 12,240,569 B2
(45) Date of Patent: Mar. 4, 2025

(54) FLOATING TYPE AQUATIC SUPPORT APPARATUS

(71) Applicant: Su Hwan Kim, Changwon-si (KR)

(72) Inventor: Su Hwan Kim, Changwon-si (KR)

( * ) Notice: Subject to any disclaimer, the term of this patent is extended or adjusted under 35 U.S.C. 154(b) by 497 days.

(21) Appl. No.: 17/607,448

(22) PCT Filed: Jan. 3, 2020

(86) PCT No.: PCT/KR2020/000098
§ 371 (c)(1),
(2) Date: Oct. 29, 2021

(87) PCT Pub. No.: WO2020/222397
PCT Pub. Date: Nov. 5, 2020

(65) Prior Publication Data
US 2022/0212763 A1     Jul. 7, 2022

(30) Foreign Application Priority Data
Apr. 29, 2019    (KR) .......................... 10-2019-0049575

(51) Int. Cl.
*B63B 39/00* (2006.01)
*B63B 35/44* (2006.01)
*F03D 9/00* (2016.01)
*F03D 13/25* (2016.01)

(52) U.S. Cl.
CPC ............. *B63B 39/00* (2013.01); *B63B 35/44* (2013.01); *B63B 2035/446* (2013.01); *B63B 2221/20* (2013.01); *F03D 9/007* (2013.01); *F03D 13/25* (2016.05); *F05B 2220/708* (2013.01); *F05B 2240/93* (2013.01); *F05B 2240/95* (2013.01)

(58) Field of Classification Search
CPC ..... B63B 39/00; B63B 35/44; B63B 2035/44; B63B 2221/20; B63B 2209/18; B63B 2209/20; B63B 2221/22; B63B 2241/06; B63B 2221/00; F03D 9/007; F03D 13/25; F03D 13/20; F05B 2220/708; F05B 2220/93; F05B 2220/95; Y02E 10/70
USPC .......................... 114/121, 123, 264, 266, 267
See application file for complete search history.

(56) References Cited

FOREIGN PATENT DOCUMENTS

| CN | 108533462 A | * | 9/2018 | ............ F03D 80/00 |
|---|---|---|---|---|
| JP | 2016109126 A | | 6/2016 | |
| KR | 1020110037334 A | | 4/2011 | |
| KR | 1020120041814 A | | 5/2012 | |

(Continued)

OTHER PUBLICATIONS

International Search Report of PCT/KR2020/000098 published on Nov. 5, 2020.
Written opinion of PCT/KR2020/000098 published on Nov. 5, 2020.

*Primary Examiner* — Daniel V Venne

(57) ABSTRACT

Provided is a floating-type on-water support apparatus comprising: a ball in which a guide groove is formed along a circumferential surface thereof; a floating unit including a floating part which floats on water and supports the ball so that the ball is rotatable; and a support rod of which one end is exposed above the water so that a structure is installable thereon and the other end is heavier than the one end so that the support rod stands vertically and which passes through the circumferential surface and is coupled to the ball, wherein the floating unit further includes a restriction protrusion fitted into the guide groove to restrict the ball from being rotated about an axis of the support rod.

4 Claims, 11 Drawing Sheets

(56) References Cited

FOREIGN PATENT DOCUMENTS

| KR | 1020130058250 A | 6/2013 |
| KR | 101596297 B1 | 2/2016 |
| KR | 1020170051204 A | 5/2017 |
| KR | 1020170108900 A | 9/2017 |
| KR | 101857949 B1 | 5/2018 |

* cited by examiner

FLOATING TYPE AQUATIC SUPPORT APPARATUS

TECHNICAL FIELD

The present invention relates to a floating-type on-water support apparatus, and more specifically, to a floating-type on-water support apparatus allowing an offshore structure to be prevented from rotating in place.

BACKGROUND OF THE INVENTION

A floating-type on-water support apparatus, which is disclosed in Public Patent No. 10-2017-0108900 and Registered Patent No. 10-1857949 and on which a wind power generator or another structure can be installed, is developed in order to install the wind power generator on the sea because a magnitude of a wind is not large due to friction with the ground of the land.

The above-disclosed floating-type on-water support apparatus includes a ball, a floating part, and a support rod. The floating part floats on water and supports the ball. The support rod is coupled to the ball, and one end of the support rod is heavier than the other end thereof. Accordingly, the support rod stands vertically. A wind power generator or another structure may be installed on one end of the support rod.

RELATED ART DOCUMENT

Patent Document

Publication Patent No. 10-2017-0108900 (Publication Date: Sep. 27, 2017)
Patent No. 10-1857949 (Registration Date: May 9, 2018)
Publication Patent No. 10-2017-0051204 (Publication Date: May 11, 2017)

SUMMARY OF THE INVENTION

In the case of a disclosed conventional floating-type on-water support apparatus, a support rod is coupled to a ball. In this case, since the ball is supported by a floating part, the ball may be rotated. Accordingly, the support rod may also be rotated about a central axis thereof. In this case, when a wind power generator is installed on the support rod, the wind power generator may be rotated about the central axis thereof. Then, since blades of the wind power generator are not directed to face the wind, there is a problem in that a power generation quantity is reduced.

The present invention is directed to providing a floating-type on-water support apparatus capable of allowing a support rod for supporting a structure to be prevented from being rotated about an axis of the support rod even when the support rod may be rotated about a ball.

According to an aspect of the present invention, there is provided a floating-type on-water support apparatus including a ball, a floating unit, and a support rod.

A guide groove is formed along a circumferential surface of the ball. The floating unit includes a floating part which floats on water and supports the ball so that the ball is rotatable. One end of the support rod is exposed above the water so that a structure is installable, the other end is heavier than the one end so that the support rod stands vertically, and the support rod passes through the circumferential surface and is coupled to the ball. In this case, the floating unit further includes a restriction protrusion fitted into the guide groove to restrict the ball from being rotated about an axis of the support rod.

In addition, in the floating-type on-water support apparatus, the floating unit may further include a fixing member by which the restriction protrusion is installed on the floating part.

The ball may further include a fixing groove formed in the guide groove at two sides of the ball to be perpendicular to a central axis of the support rod. In this case, the restriction protrusion may be fixed to the fixing member to be movable toward or away from the fixing member in a radius direction of the ball so as to be fitted into the fixing groove.

The fixing member may include a moving plate and a fixing frame. The moving plate may be coupled to the restriction protrusion so that the restriction protrusion is moveable forward and rearward when the restriction protrusion is rotated and bent in a circumferential direction the ball. The fixing frame may be coupled to the floating part to restrict the moving plate to be slidable within a predetermined distance in the circumferential direction of the ball.

The fixing member may further include a clamp coupled to the fixing frame to press the moving plate so as to fix sliding of the moving plate.

The floating-type on-water support apparatus may further include a blocking cover coupled to the floating part to prevent water, on which the floating unit floats, from being introduced into the ball.

In addition, according to another aspect of the present invention, there is provided a floating-type on-water support apparatus including a floating unit, a support unit, and an installation base. The floating unit includes a floating part which floats on water. The support unit includes a coupling rod coupled to the floating part and a support rod of which one end is coupled to the coupling rod coupled using a universal joint 301 and the other end is heavier than the one end so that the support rod stands vertically. The installation base is exposed above the floating unit and coupled to the support rod so that a structure is installable on one end thereof.

The floating-type on-water support apparatus may further include a blocking cover coupled to the floating part to prevent water from being introduced into the universal joint 301.

The support rod may be coupled using a joint to be foldable 201.

A weight of the support rod may be adjustable by injecting a fluid into the other end of the support rod.

The floating part may be formed as a hollow case to accommodate the other end of the support rod therein.

In addition, the floating-type on-water support apparatus may further include a solar panel installed on the floating part.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

Figure 1:
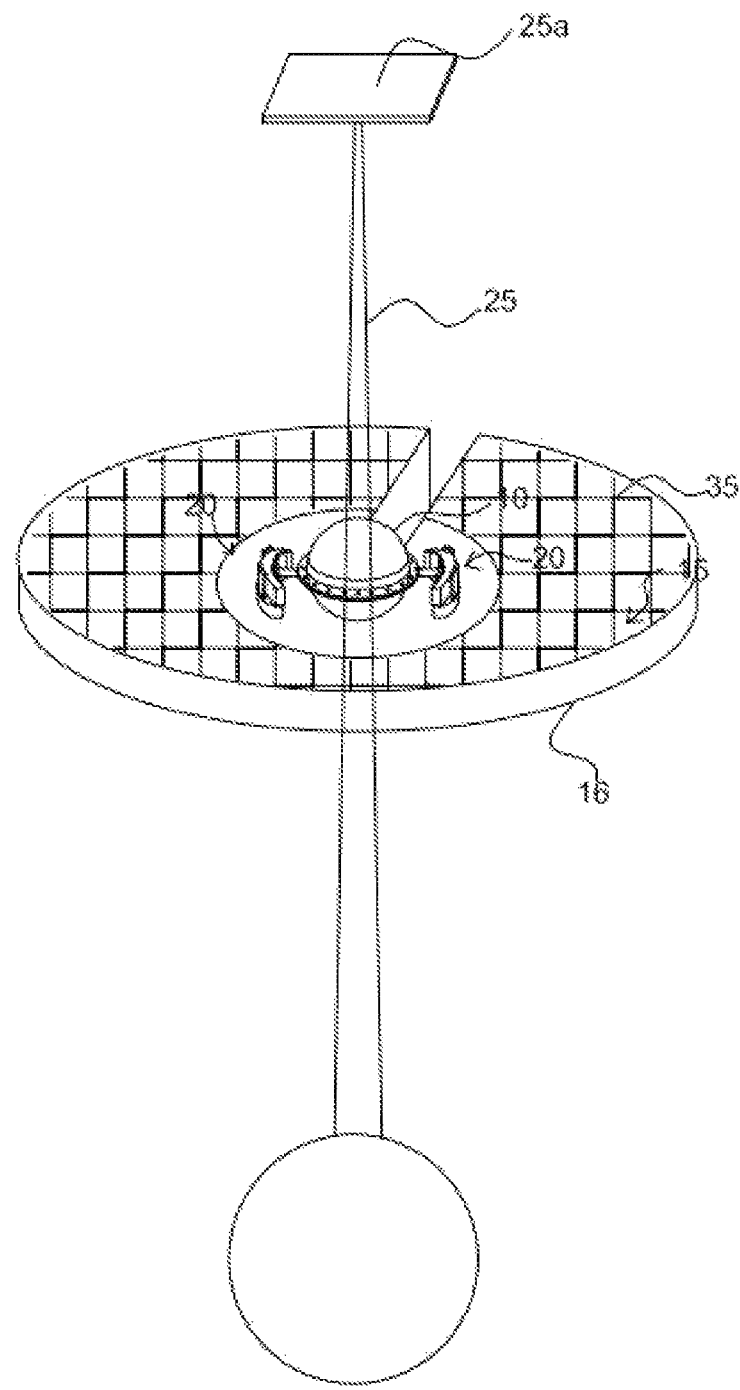
FIG. 1 is a conceptual view illustrating one embodiment of a floating-type on-water support apparatus according to the present invention.
Figure 2:
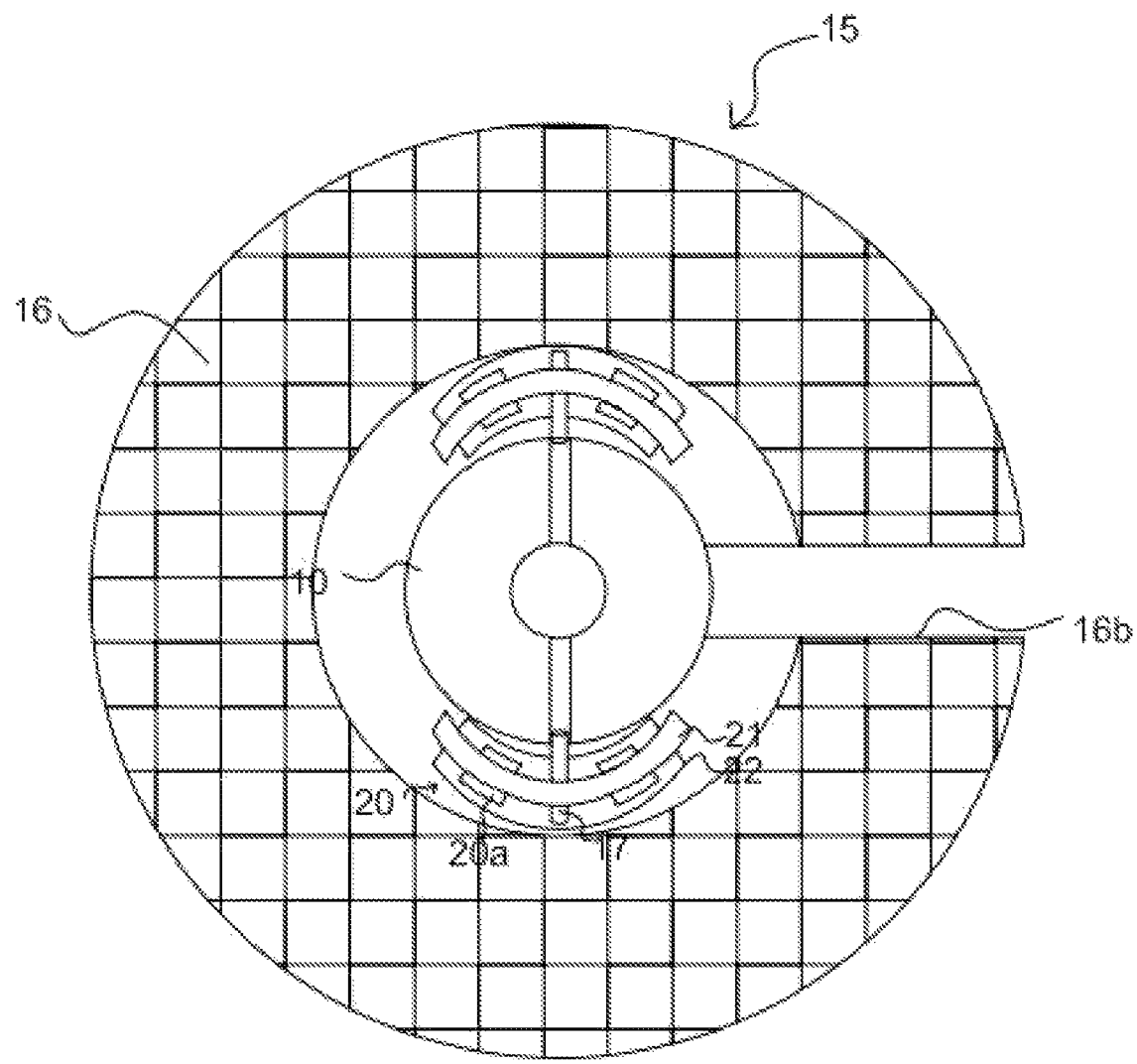
FIG. 2 is a plan view illustrating the embodiment of FIG. 1.
Figure 3:
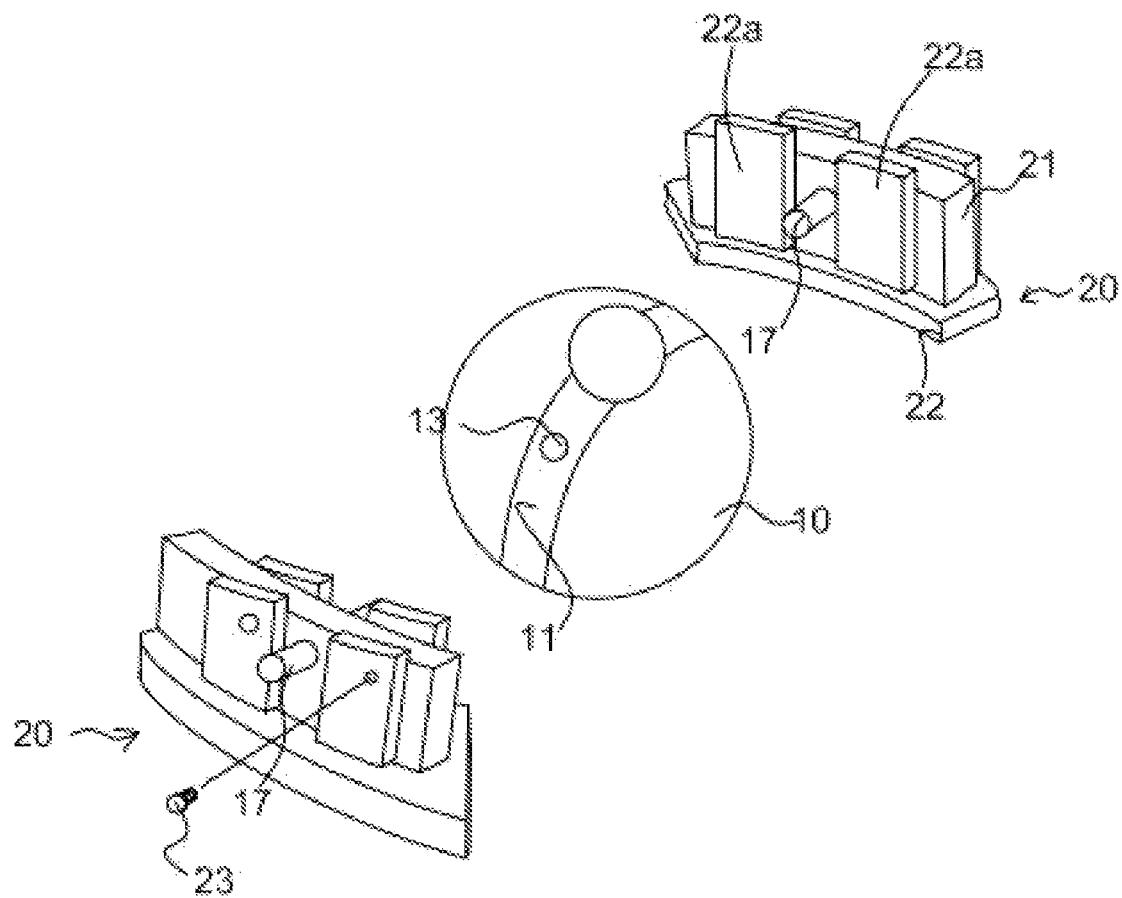
FIG. 3 is a conceptual view illustrating a ball and a fixing member of the embodiment of FIG. 1.
Figure 4:
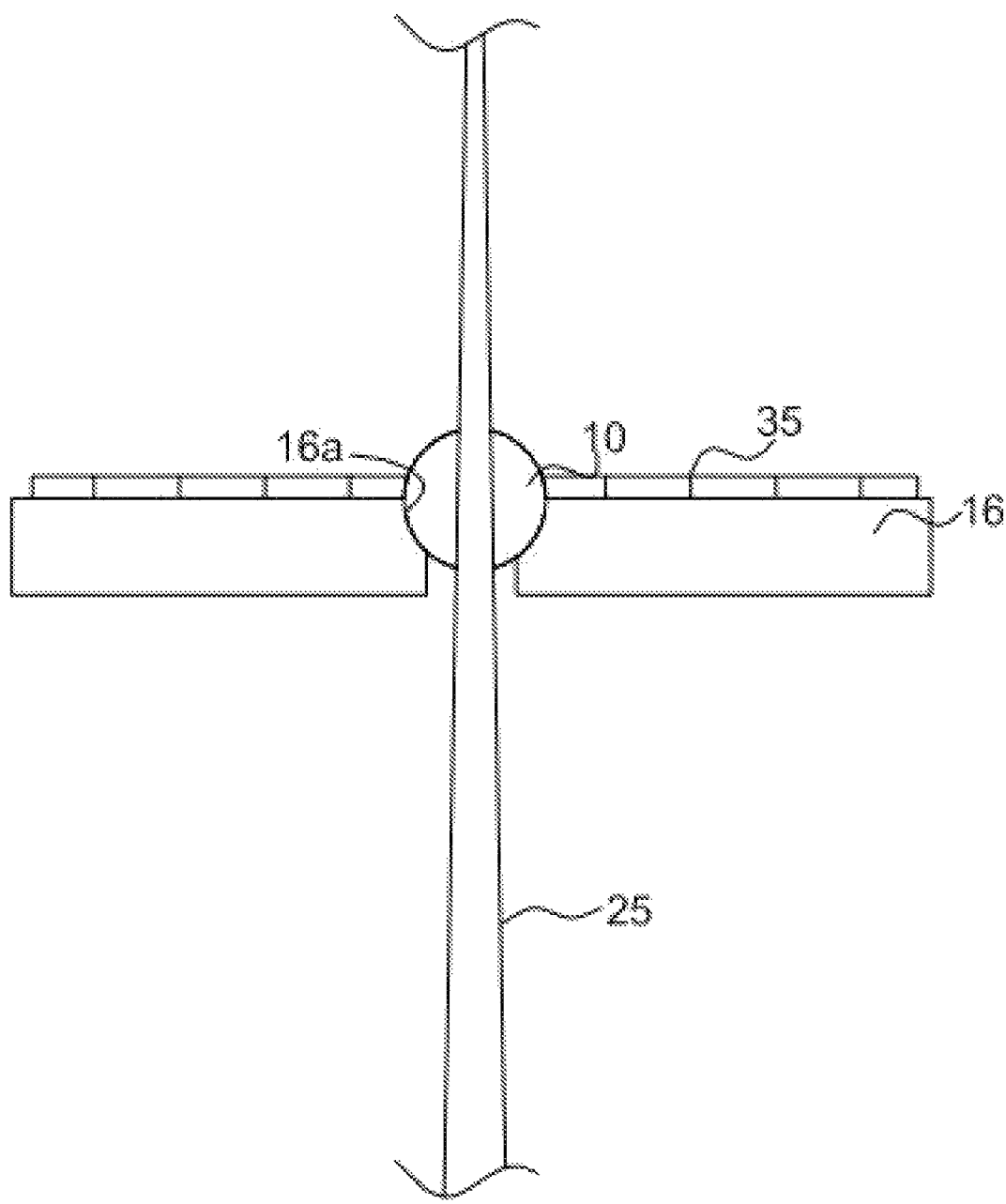
FIG. 4 is a cross-sectional view illustrating a floating unit according to the embodiment of FIG. 1.

A floating-type on-water support apparatus according to one embodiment of the present invention will be described with reference to FIGS. 1 to 4.

The floating-type on-water support apparatus according to the present invention includes a ball 10, a floating unit 15, a support rod 25, and a solar panel 35.

A guide groove 11 and fixing grooves 13 are formed in the ball 10. The guide groove 11 is formed along a circumferential surface of a virtual cross section passing through a center of the ball 10. That is, the guide groove 11 is formed along the circumferential surface in which a diameter of the ball 10 is defined. In addition, the fixing grooves 13 are formed in the guide groove 11 at two sides, which are opposite to each other, of the ball 10 in directions toward the center of the ball 10.

Figure 5:
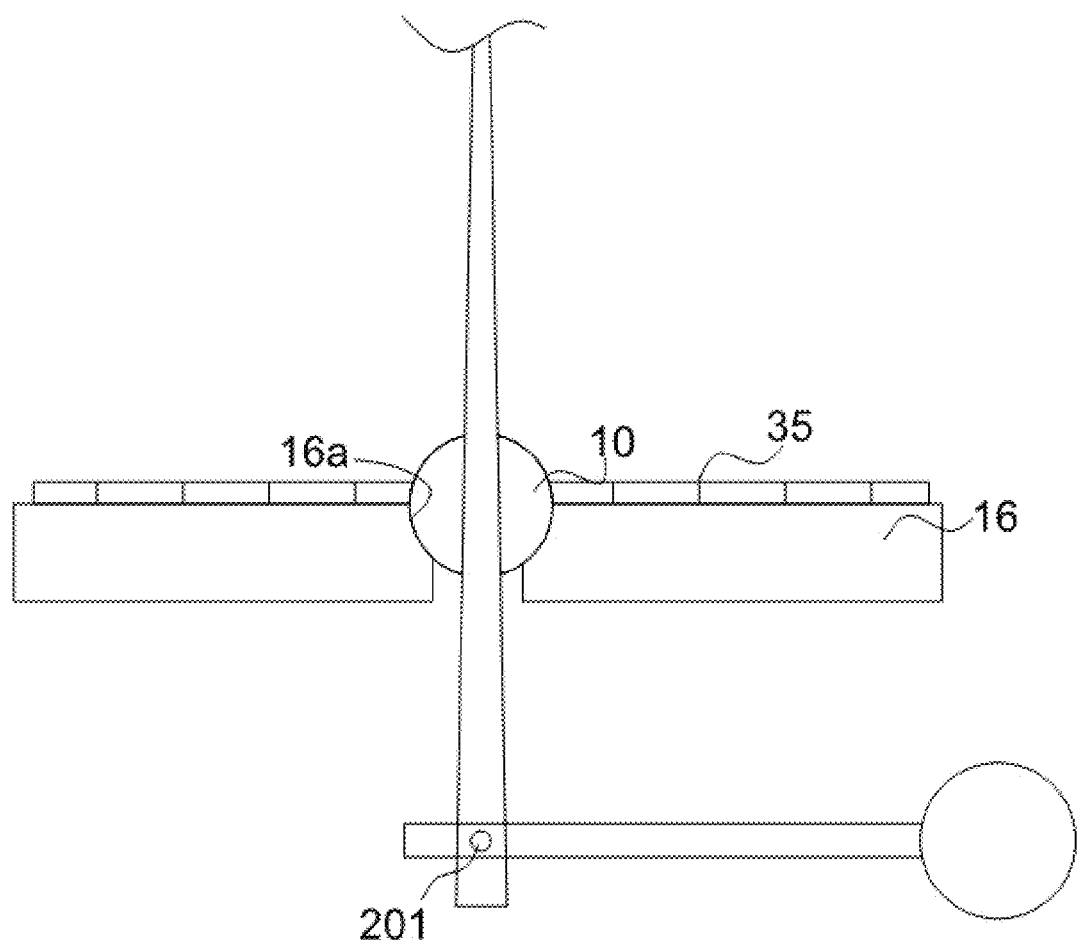
FIG. 5 is a conceptual view illustrating a floating-type on-water support apparatus according to another embodiment of the present invention.

The support rod 25 is coupled to the ball 10, and since the support rod 25 should stand vertically so that one end 25a of the support rod 25 is positioned above water and the other end thereof is positioned in the water, the other end is formed to be heavier than the one end 25a. In this case, a structure such as a wind power generator may be installed on the one end 25a of the support rod 25. When the support rod 25 is coupled to the ball 10, the support rod 25 is coupled to pass through the guide groove 11 and the center of the ball 10 to be perpendicular to the fixing grooves 13. In order to change a weight of the support rod 25, a fluid may be injected into or is discharged from the support rod 25 as in the conventional invention. Meanwhile, as illustrated in FIG. 5, a support rod 25 may be connected using a hinge to be foldable. This is to facilitate easy disassembling or assembling of a floating-type on-water support apparatus. In this way, the support rod 25 that is foldable or allows a fluid to be injected thereinto may be applied to any embodiment which will be described below.

The floating unit 15 includes a floating part 16, restriction protrusions 17, and fixing members 20.

The floating part 16 floats on water and supports the ball 10. Accordingly, an accommodation part 16a configured to accommodate and support the ball 10 is formed at a center of the floating part 16, and a cut portion 16b is formed by cutting the floating part 16 from the accommodation part 16a to an outer circumferential surface thereof so that the support rod 25 is positioned in the accommodation part 16a or the other end of the support rod 25, which is submerged in the water, is moved upward above the floating part 16.

One end of the restriction protrusion 17 is fitted into the guide groove 11 so that the ball 10 is not rotated about an axis of the support rod 25. In this case, a screw is formed on the other end of the restriction protrusion 17 to move forward or rearward in the fixing member 20.

The fixing members 20 serve to install the restriction protrusions 17 on the floating unit 15. To this end, the fixing members 20 include moving plates 21, fixing frames 22, and clamps 23.

The moving plate 21 is screw-coupled to the other end of the restriction protrusion 17 so that the restriction protrusion 17 is moved forward or rearward when the restriction protrusion 17 is rotated and is formed to be bent in a circumferential direction of the ball 10.

The fixing frames 22 are coupled to the floating part 16 so that the moving plate 21 is slidable within a predetermined distance in a curvature direction of the moving plate 21. To this end, the fixing frame 22 guides the moving plate 21 to slide, and in this case, collision bars 22a are formed to be spaced apart from each other by the predetermined distance so that the moving plate 21 collides with the restriction protrusion 17 after sliding the predetermined distance. That is, the restriction protrusion 17 may slide only between the collision bars 22a spaced apart from each other by the predetermined distance. Accordingly, the moving plate 21 is slidable only within the predetermined distance like the collision bar 22a.

The clamp 23 restricts sliding of the moving plate 21. In some cases, the moving plate 21 should not slide, and the moving plate 21 should be fixed to not slide. In this case, the sliding of the moving plate 21 may be restricted by the clamp 23. To this end, the clamp 23 is coupled to the fixing frame 22 to press the moving plate 21 when the clamp 23 is coupled to the fixing frame 22. In the case of the present embodiment, the clamp 23 is screw-coupled to the fixing frame 22 to press the moving plate 21.

The solar panel 35 is installed on the floating part 16. Accordingly, the floating-type on-water support apparatus according to the present embodiment may be self-powered. In the case of the present embodiment, the solar panel 35 is installed on the floating part 16, but a vertical wind power generator may be installed instead of the solar panel 35, or both of the vertical wind power generator and the solar panel 35 may be installed thereon. The solar panel 35 and the vertical wind power generator may also be installed in any embodiment which will be described below.

When the floating-type on-water support apparatus according to the present embodiment is installed on the sea, the support rod 25 stands vertically. In this case, a wind power generator and the like are installed on the support rod 25. When the restriction protrusion 17 is rotated and fitted into the guide groove 11 of the ball 10, the ball 10 is prevented from being rotated about the axis of the support rod 25. However, the ball 10 is restricted from being rotated about the axis of the support rod 25 but may be rotated about an axis perpendicular to the axis of the support rod 25. Accordingly, even when a wave hits and shakes the floating part 16, the shaking of the floating part 16 is not transferred to the support rod 25.

However, in this case, the moving plate 21, on which the restriction protrusion 17 is installed, may slide the predetermined distance. Accordingly, the support rod 25 may be shaken about the axis of the support rod 25 within the predetermined distance. When a strong wind blows to rotate the support rod 25 in the axis direction thereof, a severe load is applied to the restriction protrusion 17, and thus the restriction protrusion 17 or the ball 10 may be damaged. In this case, the moving plate 21 coupled to the restriction protrusion 17 may slide to reduce the impact. When the moving plate 21 positioned at one side slides, the moving plates 21 positioned at both sides of the ball 10 slide in the same direction. In addition, the moving plates 21 slide in the circumferential direction of the ball 10. Accordingly, even when the moving plates 21 slide, a predetermined distance between the restriction protrusions 17 positioned at both sides of the ball 10 is maintained. Accordingly, the restriction protrusions 17 are not separated from the guide groove 11 of the ball.

Meanwhile, in order to install or dismantle the floating-type on-water support apparatus, the support rod 25 should be rotated to be moved upward above the floating part 16 in order to move the floating-type on-water support apparatus. In this case, the support rod 25 should be rotated so that a part, which is submerged in water, of the support rod 25 is moved upward through the cut portion 16b of the floating part 16. Accordingly, the support rod 25 should be restricted to being rotated about only one axis. In this case, the restriction protrusion 17 is rotated to be moved further forward. Then, the restriction protrusion 17 is rotated and fitted into the fixing groove 13. Accordingly, the ball 10 may be restricted from being rotated in the other direction and may be rotated about an axis of the restriction protrusion 17. Accordingly, the support rod 25 may be easily rotated and moved upward above the floating part 16.

According to the present embodiment, since the guide groove 11 is formed in the ball 10 and the restriction protrusion 17 is fitted into the guide groove 11, the ball 10 may be restricted from being rotated about the axis of the support rod 25. Accordingly, in a case in which the wind power generator and the like are installed on the support rod 25, a shaft of the wind power generator may be prevented from being rotated by a wind. However, in this case, the shaft of the wind power generator may be rotated within the distance within which the moving plate 21 is moved in the circumferential direction of the ball 10.

In addition, since the restriction protrusion 17 fitted into the guide groove 11 may be moved with the moving plate 21 within the predetermined distance in order to prevent the support rod 25 from being rotated about the axis thereof, even when a severe load is applied to the restriction protrusion 17, the impact of the severe load can be reduced.

In addition, since the restriction protrusion 17 may be moved forward and fitted into the fixing groove 13 of the ball 10, the ball 10 is restricted to being rotated in an axis direction of the restriction protrusion 17. Accordingly, the support rod 25 may be easily moved upward above the floating part 16.

Figure 6:
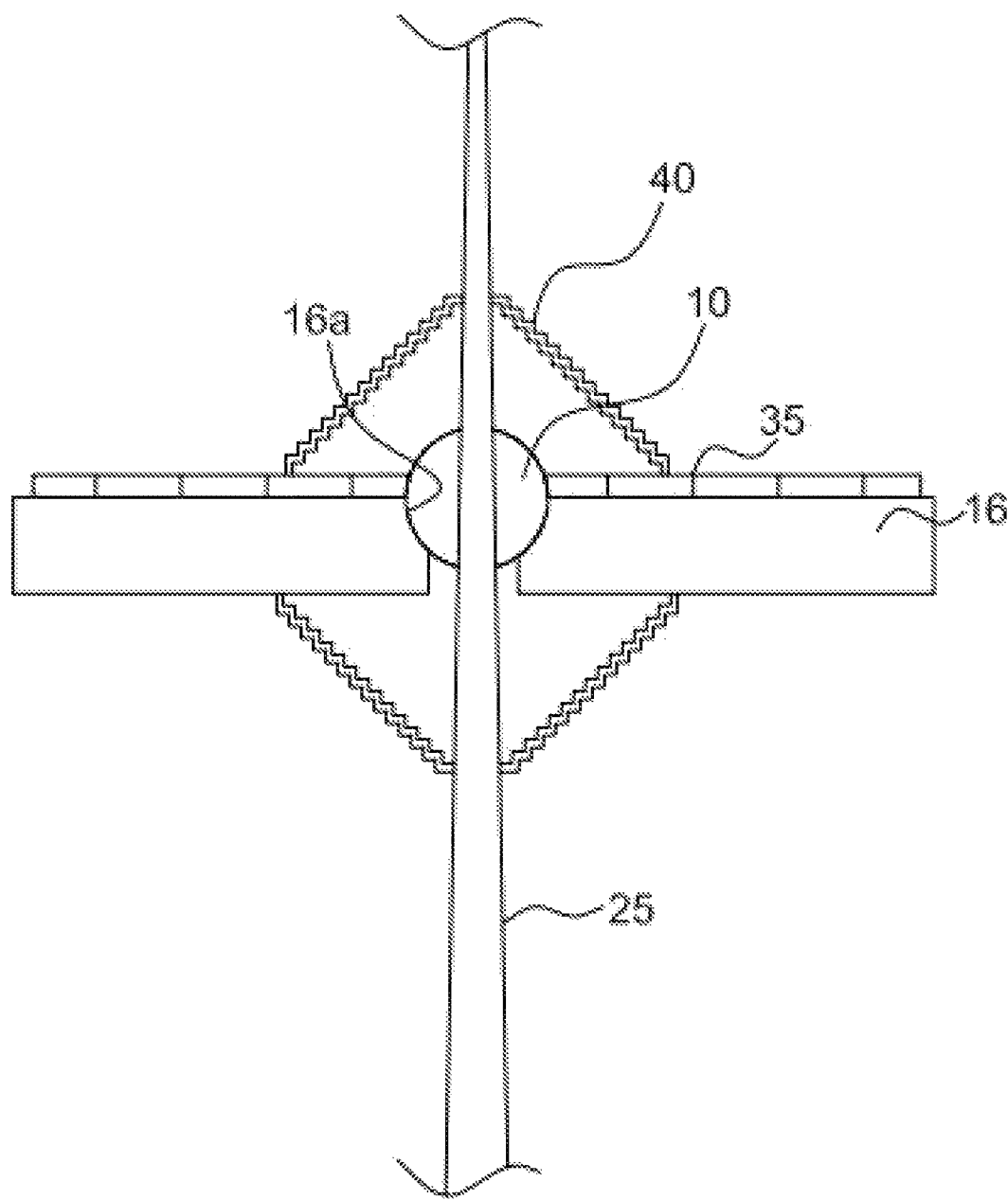
FIG. 6 is a conceptual view illustrating a floating-type on-water support apparatus according to still another embodiment of the present invention.

FIG. 6 is a conceptual view illustrating a floating-type on-water support apparatus according to another embodiment of the present invention. The embodiment of FIG. 6 further includes blocking covers 40 in addition to the embodiment of FIG. 1. The blocking covers 40 are installed on a floating part 16 to prevent water from being introduced into a ball 10. The blocking cover 40 may be installed on only a lower portion of the floating part 16 or the blocking covers 40 may be installed on both of the lower portion and an upper portion of the floating part 16 to prevent water from being introduced into the ball 10. The blocking cover 40 may be formed of a flexible material to be easily deformed when the floating part 16 is shaken.

Figure 7:
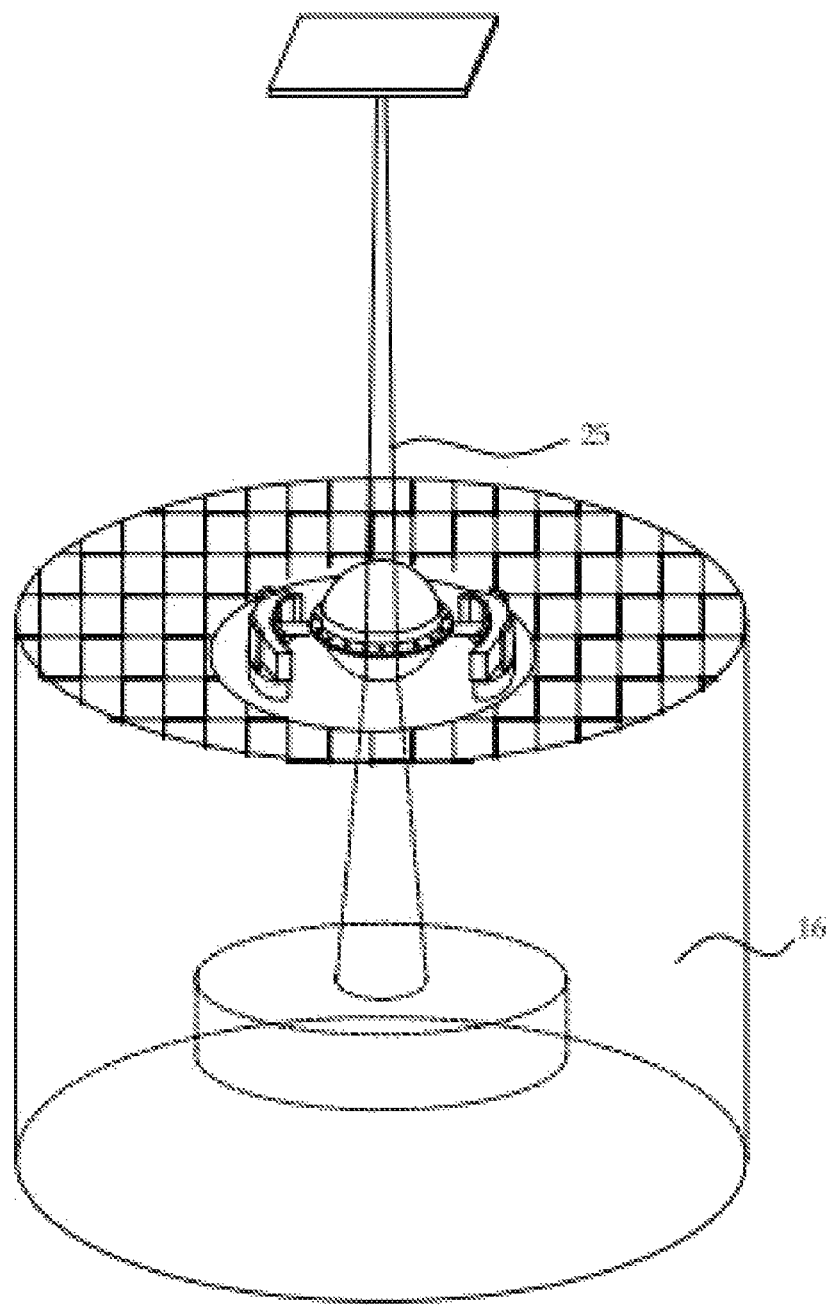
FIG. 7 is a conceptual view illustrating a floating-type on-water support apparatus according to yet another embodiment of the present invention.

FIG. 7 is a view illustrating a floating-type on-water support apparatus according to still another embodiment of the present invention. In the embodiment of FIGS. 1 to 4, the floating part 16 is formed as a plate and the other end of the support rod 25 is submerged in water, but in the embodiment of FIG. 7, a floating part 16 is formed as a hollow case to accommodate the other end of the support rod 25 therein. Even when a wave hits the floating part 16 and the floating part 16 is shaken due to the wave, the support rod 25 should not be affected by the wave. In this case, since the other end of the support rod 25 is accommodated in the floating part 16, the support rod 25 is not affected by the wave at all, and thus the support rod 25 may be more safely maintained vertically.

Figure 8:
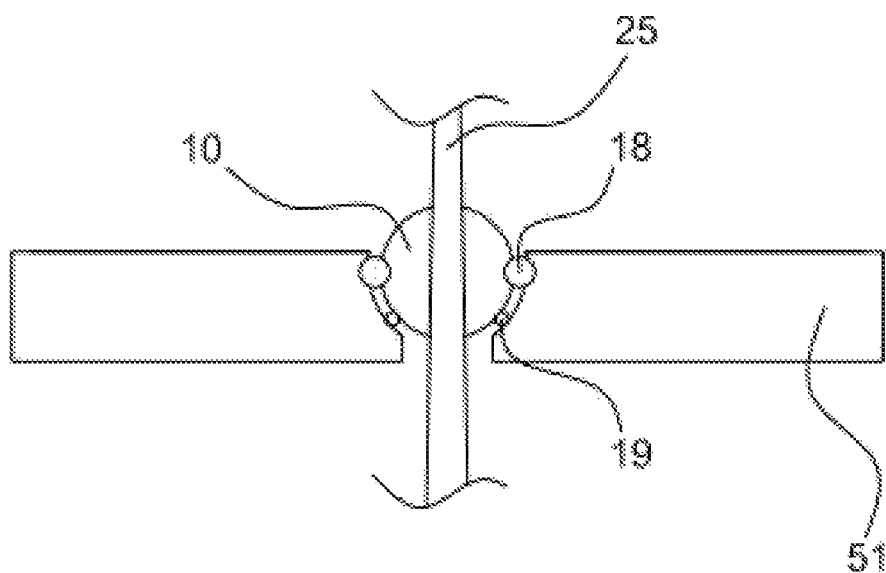
FIG. 8 is a conceptual view illustrating a floating-type on-water support apparatus according to yet another embodiment of the present invention.

FIG. 8 is a view illustrating a floating-type on-water support apparatus according to another embodiment of the present invention.

The embodiment of FIGS. 1 to 4 includes the restriction protrusion 17 and the fixing member 20 for restricting rotation of the ball 10. In the embodiment of FIG. 8, a restriction protrusion 18 is formed as a ball type to restrict rotation of a ball 10 and fitted into a guide groove 11. In this case, the ball 10 does not need a fixing groove 13, and a groove capable of accommodating the restriction protrusion 18 is formed in a floating part 16. Since the restriction protrusion 18 is accommodated in the floating part 16, a fixing member 20 is also not needed. Meanwhile, in order to reduce friction between the ball 10 and the floating part 16, a bearing 19 supporting the ball 10 may be installed in the floating part 16.

Figure 9:
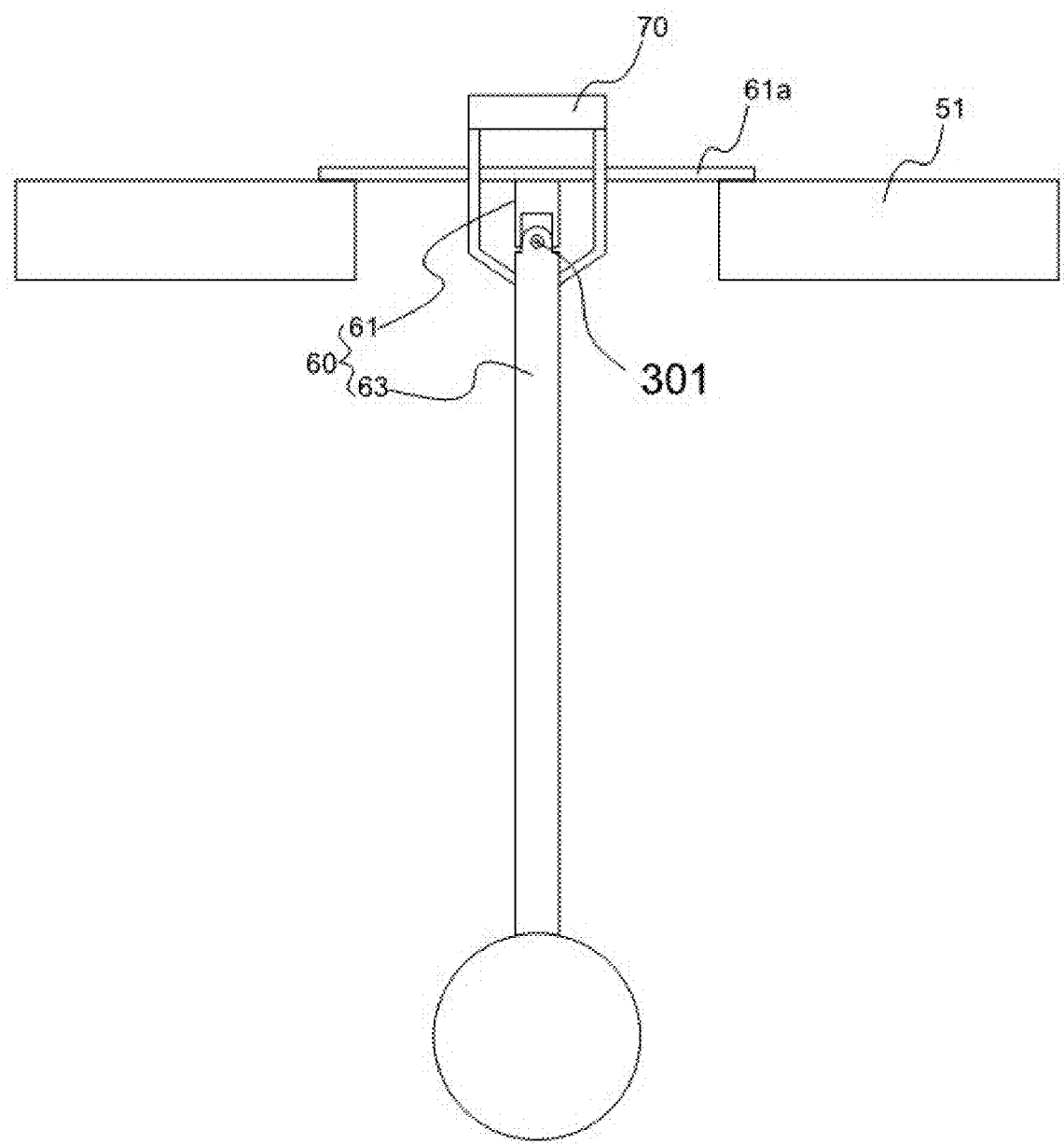
FIG. 9 is a conceptual view illustrating a floating-type on-water support apparatus according to yet another embodiment of the present invention.
Figure 10A:
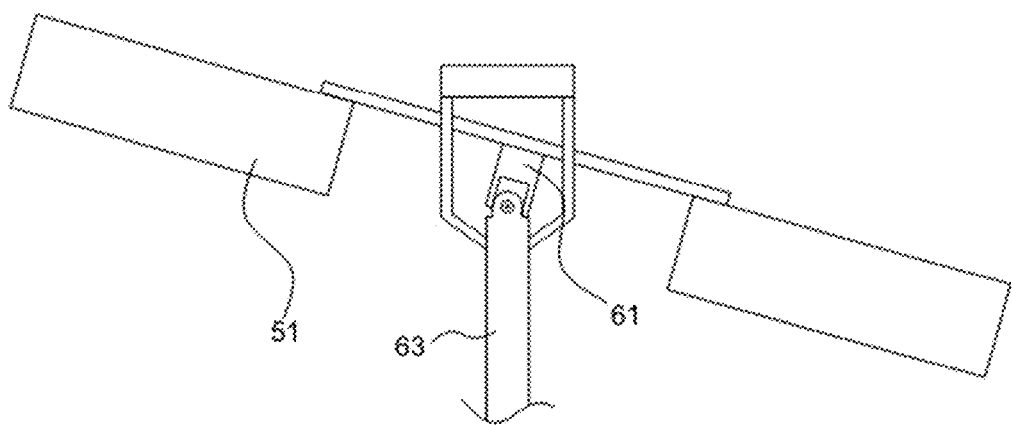
FIGS. 10A and 10B are a set of operational views illustrating the embodiment of FIG. 9.
Figure 10B:
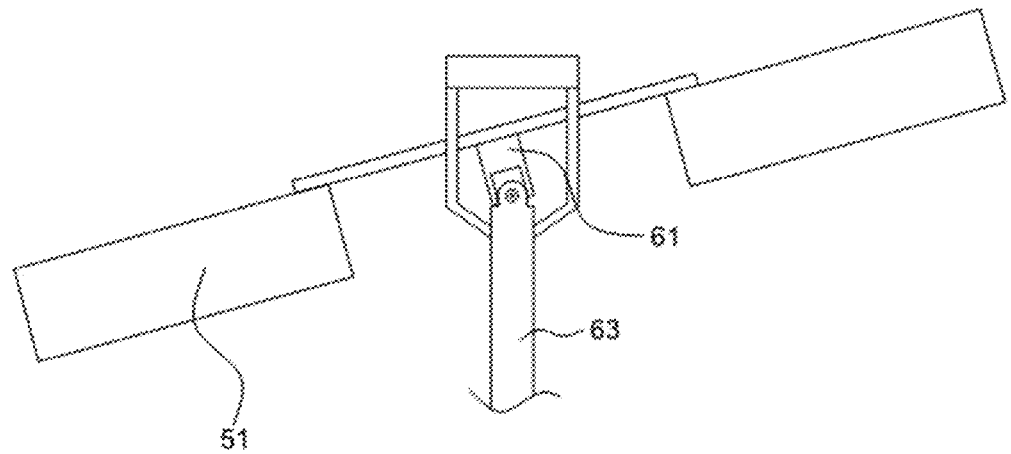

FIGS. 9 and 10 are views illustrating a floating-type on-water support apparatus according to yet another embodiment of the present invention.

The floating-type on-water support apparatus according to the present invention incudes a floating unit, a support unit 60, and an installation base 70.

The floating unit includes a floating part 51, and the floating part 51 is the same as that of the above-described embodiment.

The support unit 60 includes a coupling rod 61 and a support rod 63 and is installed on the floating part 51. An upper end of the coupling rod 61 is formed as a support plate 61a and coupled to the floating part 16, and a lower end thereof is formed to be coupled to the support rod 63 using a universal joint 301. An upper end of the support rod 63 is coupled to the lower end of the coupling rod 61 using the universal joint 301. Accordingly, the coupling rod 61 may be rotated in front, rear, left, and right directions with respect to the support rod 63. A lower end of the support rod 63 is formed to be heavier than the upper end thereof. Accordingly, the support rod 63 always stands vertically.

The installation base 70 is exposed above the floating unit so that a structure such as a wind power generator is installed thereon, passes through a through hole formed at a center of the floating part 51, and is coupled to the support rod 63. Accordingly, since the installation base 70 is integrally coupled to the support rod 63, an angle, which is the same as an angle of the support rod 63, of the installation base 70 is maintained. Accordingly, when the support rod 63 stands, the installation base 70 also stands.

In the case of the present embodiment, since the coupling rod 61 is coupled to the support rod 63 using a universal joint 301, the coupling rod 61 is rotatable in the front and rear or left and right directions with respect to the support rod 63. Accordingly, when a wave hits the floating part 51, the floating part 51 is shaken in the front and rear or left and right directions as illustrated in FIG. 10. Even when the floating part 51 is shaken in the front and rear or left and right directions, since the lower end of the support rod 63 is heavier, the floating part 51 is not shaken in the front and rear or left and right directions and stands vertically. Accordingly, even in the case of the present embodiment, since the installation base 70 stands vertically, when the wind power generator is installed on the installation base 70, the wind power generator may be maintained vertically regardless of a wave.

Figure 11:
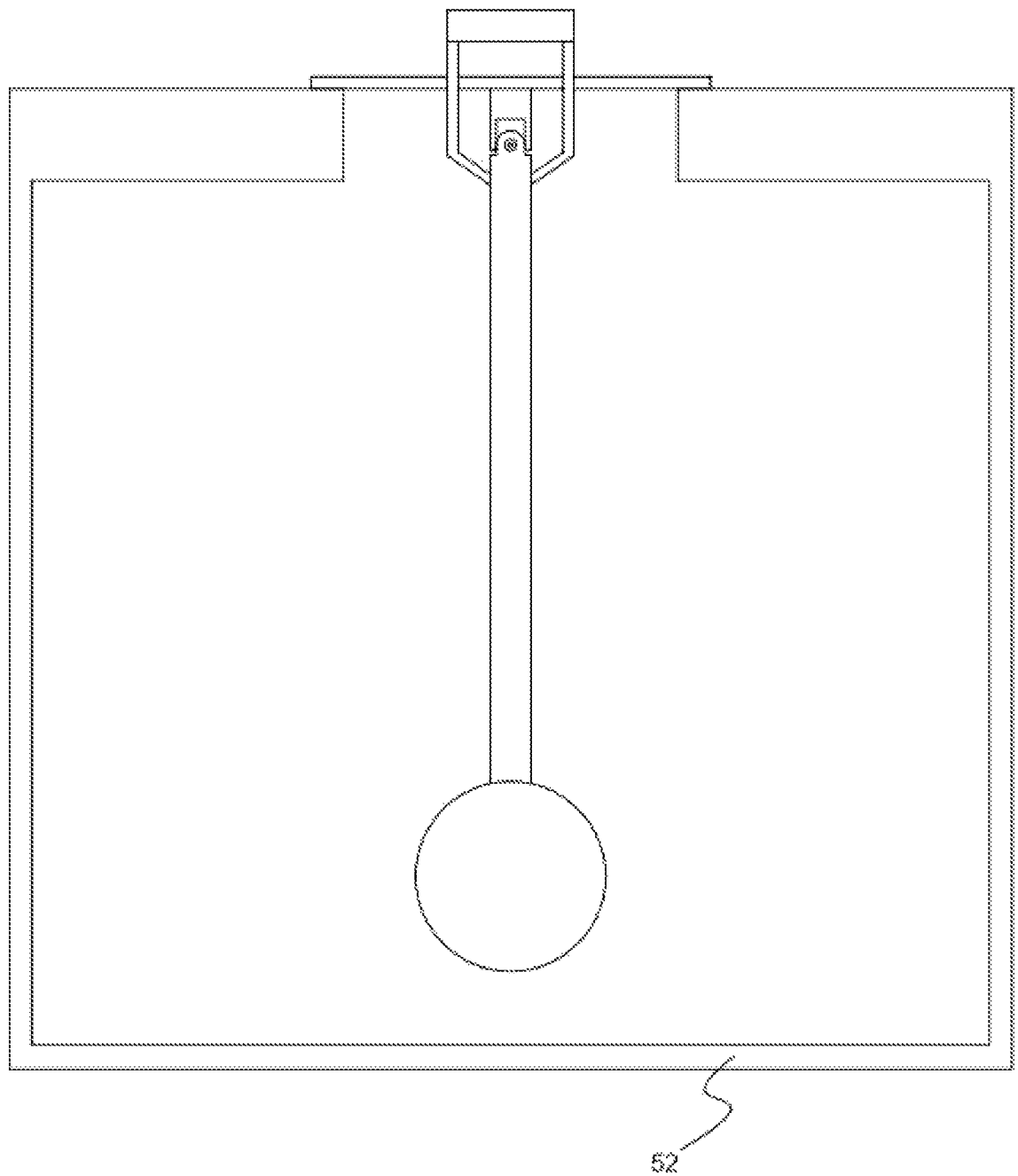
FIG. 11 is a conceptual view illustrating a floating-type on-water support apparatus according to yet another embodiment of the present invention.

FIG. 11 is a view illustrating a floating-type on-water support apparatus according to yet another embodiment of the present invention.

In the embodiment illustrated in FIG. 11, a floating part 52 in the embodiment of FIG. 9 is formed as a hollow case as in the embodiment of FIG. 7 and surrounds a support rod 63.

In addition, even in cases of the embodiments of FIGS. 7 to 11, a blocking cover 40 may be installed therein as illustrated in FIG. 6.

According to the present invention, since a restriction protrusion is fitted into a guide groove of a ball, a support rod coupled to the ball may be prevented from being rotated about a central axis thereof. Accordingly, when a wind power generator is installed on the support rod, rotation of a shaft of the wind power generator due to a wind can be prevented.

In addition, a moving plate can slide a predetermined distance on a fixing frame. In this case, when a load by which the support rod is rotated about an axis thereof is large, since some of the load can be absorbed, the restriction protrusion or the ball can be prevented from being damaged due to the severe load.

What is claimed is:
1. A floating-type on-water support apparatus comprising:
a ball in which a guide groove is formed along a circumferential surface thereof;
a floating unit including a floating part which floats on water and supports the ball so that the ball is rotatable; and
a support rod,
wherein a first end of the support rod is exposed above the water and a second end of the support rod is heavier than the first end so that the support rod stands vertically, passes through the circumferential surface, and is coupled to the ball,
wherein the floating unit further includes a restriction protrusion fitted into the guide groove to restrict the ball from being rotated about an axis of the support rod,
wherein the floating unit further includes a fixing member by which the restriction protrusion is installed on the floating part,
wherein the ball further includes a fixing groove formed in the guide groove at two sides of the ball to be perpendicular to a central axis of the support rod,
wherein the restriction protrusion is fixed to the fixing member to be movable toward or away from the fixing member in a radius direction of the ball so as to be fitted into the fixing groove.
2. The floating on-water support apparatus of claim 1, wherein the support rod is coupled using a joint to be foldable.
3. The floating-type on-water support apparatus of claim 2, wherein a weight of the support rod is adjustable by injecting a fluid into the second end of the support rod.
4. The floating-type on-water support apparatus of claim 3, wherein the floating part is formed as a hollow case to accommodate the second end of the support rod therein.

* * * * *